(12) United States Patent
Poledna et al.

(10) Patent No.: US 10,571,920 B2
(45) Date of Patent: Feb. 25, 2020

(54) FAULT-TOLERANT METHOD AND DEVICE FOR CONTROLLING AN AUTONOMOUS TECHNICAL SYSTEM BASED ON A CONSOLIDATED MODEL OF THE ENVIRONMENT

(71) Applicant: FTS Computertechnik GmbH, Vienna (AT)

(72) Inventors: Stefan Poledna, Klosterneuburg (AT); Georg Niedrist, Guntramsdorf (AT); Eric Schmidt, Grosskrut (AT); Christopher Helpa, Vienna (AT); Hermann Kopetz, Baden (AT)

(73) Assignee: TTTech Auto AG, Vienna (AT)

( * ) Notice: Subject to any disclaimer, the term of this patent is extended or adjusted under 35 U.S.C. 154(b) by 0 days.

(21) Appl. No.: 15/678,181

(22) Filed: Aug. 16, 2017

(65) Prior Publication Data

US 2018/0052465 A1 Feb. 22, 2018

(30) Foreign Application Priority Data

Aug. 16, 2016 (AT) ................................ A 50738/2016

(51) Int. Cl.
*G05D 1/02* (2020.01)
*G05D 1/00* (2006.01)
(Continued)

(52) U.S. Cl.
CPC ......... *G05D 1/0212* (2013.01); *G05D 1/0055* (2013.01); *G05D 1/0077* (2013.01);
(Continued)

(58) Field of Classification Search
CPC .. G05D 1/0212; G05D 1/0055; G05D 1/0088; G05D 1/0077; G06F 11/1487;
(Continued)

(56) References Cited

U.S. PATENT DOCUMENTS 9,063,546 B2 6/2015 Hauler et al.
2012/0166878 A1\* 6/2012 Sinha .................... G06F 11/079
714/37
(Continued)

FOREIGN PATENT DOCUMENTS

EP 2587378 A1 5/2013

OTHER PUBLICATIONS

Avizienis, "The N-Version Approach to Fault-tolerant Software", IEEE transactions of Software Engineering 1985, vol. SE-11, No. 12, pp. 1491-1501.
(Continued)

*Primary Examiner* — Rodney A Butler
(74) *Attorney, Agent, or Firm* — Eversheds Sutherland (US) LLP

(57) ABSTRACT

A method is provided by which a complex electronic system for controlling a safety-critical technical process, for example driving an autonomous vehicle, can be implemented. A distinction is made between simple and complex software, wherein the simple software is executed on error-tolerant hardware and wherein a plurality of diverse versions of the complex software are implemented simultaneously on independent fault containment units (FCU). A consolidated environmental model is developed from a number of different environmental models and represents the basis for trajectory planning.

15 Claims, 1 Drawing Sheet

(51) Int. Cl.
  *G06F 11/14* (2006.01)
  *G06F 11/18* (2006.01)
  *H04L 29/08* (2006.01)

(52) U.S. Cl.
  CPC ....... *G05D 1/0088* (2013.01); *G06F 11/1487* (2013.01); *G06F 11/1479* (2013.01); *G06F 11/184* (2013.01); *G06F 2201/805* (2013.01); *H04L 67/12* (2013.01)

(58) Field of Classification Search
  CPC ............ G06F 2201/805; G06F 11/184; G06F 11/1479; H04L 67/12
  See application file for complete search history.

(56) References Cited

U.S. PATENT DOCUMENTS

| | | | | |
|---|---|---|---|---|
| 2015/0046603 | A1* | 2/2015 | Poledna | G06F 9/542 709/248 |
| 2015/0331422 | A1* | 11/2015 | Hartung | G05D 1/021 701/23 |
| 2016/0033965 | A1 | 2/2016 | Kopetz | |

OTHER PUBLICATIONS

Kopetz, "Real-Time Systems", Design Principles for Distributed Embedded Applications, Springer, 2nd Edition, pp. 136-138.
Advisory Circular: System Safety Analysis and Assessment for part 23 Airplanes, U.S. Department of Transportation Federal Aviation Administration 2011, AC 23.1309-1E (56 pages).
Automotive Safety Integrity Level. Wikipedia.com. Retrieved on Aug. 28, 2017 from Wikipedia, the free encyclopedia. https://en.wikipedia.org/w/index.php?title=Automotive_Safety_Integrity_Level &oldid=781203526.
Autonomes Fahren. Wikipedia.com. Retrieved Aug. 28, 2017 from Wikipedia, the free encyclopedia. https://de.wikipedia.org/w/index.php?title=Autonomes_Fahren&oldid=168387054.
Office Action for Austrian Application No. A 50738/2016, dated Jul. 26, 2018.
Ammann, Paul, et al., "Data Diversity: An Approach to Software Fault Tolerence" IEEE Transactions on Computers, IEEE, USA, 37(4): 418-25 (Apr. 1988).
Kim, Junsung, et al., "Towards Dependable Autonomous Driving Vehicles: A System-Level Approach" ACM SIGBED Review, ACM, 2 Penn Platza, Suite 701, NY, NY 10121-0701, USA, Bd., 10, (Feb. 2013), pp. 29-32.

* cited by examiner

FAULT-TOLERANT METHOD AND DEVICE FOR CONTROLLING AN AUTONOMOUS TECHNICAL SYSTEM BASED ON A CONSOLIDATED MODEL OF THE ENVIRONMENT

CROSS-REFERENCE TO RELATED APPLICATIONS

Priority under 35 U.S.C. 119(b) is claimed to Austrian Patent Application No. A 50738/2016, filed Aug. 16, 2016, which is incorporated herein by reference in its entirety.

TECHNICAL FIELD

The present invention is within the field of computer technology. It relates to a method and a device for error-tolerant control of an autonomous technical system, in particular of a vehicle, that is autonomously guided through a given environment using a distributed computer system equipped with sensors.

BACKGROUND

The developments in sensor technology and computer technology permit the largely autonomous control of a technical system or of a vehicle that autonomously controls its destination.

The classification of autonomous driving is organized into six levels:
  Level 0: "Driver only," the driver himself drives, steers, accelerates, brakes, etc.
  Level 1: Designated assistance systems help with vehicle operation (including ACC).
  Level 2: Partial automation. Among others, automatic parking, lane-keeping function, general longitudinal guidance, acceleration, braking etc, are taken over by the assistance system (such as traffic jam assistance).
  Level 3: High-level automation. The driver does not have to monitor the system continuously. The vehicle conducts independent functions such as triggering turn indicators, lane changes and lane tracking. The driver can attend to other things, but is required to take over driving from the system within a preliminary warning period, as needed. This form of autonomy is technically feasible on highways. The legislature is working towards permitting Level 3 vehicles. There is talk of a time frame by 2020.
  Level 4: Full automation. The guidance of the vehicle is continuously taken over by the system. If the driving tasks are no longer managed by the system, the driver may be required to take over the driving.
  Level 5: Full autonomy of the vehicle. The vehicle is provided without a steering wheel, the vehicle can move around without a driver.

Level 2 has been currently realized in vehicles available on the market. At Level 2, the driver is required to continually monitor the proper functioning of the computer system and to intervene immediately in the event of a fault. At the higher automation levels, the computer system must be designed to be error tolerant in order guarantee the safety of the vehicle even in the event of an error in the computer system.

In the ISO 26262 standard, an electronic system (hardware plus software) in a vehicle must be assigned to one of four integrity levels (Level ASIL A to ASIL D), wherein the Level ASIL D represents the highest level of integrity. The integrity of electronic systems for fully automated vehicle operation (Level 4 and Level 5) must conform to ASIL D, Whereas the probability for an occurrence of a dangerous error having serious implications for the safety of a vehicle at Level ASIL B must be less than $10^{-6}$ per hour (d.s. $10^3$ FIT) this probability at ASIL D must be less than $10^{-8}$ per hour (d.s. 10 FIT).

The cause for the occurrence of a failure of an electronic system may be an error due to hardware aging (physical fault) or a design error (design fault).

An aging error is present if an assembly that was fully functional at the beginning of its useful life fails because of aging processes of the hardware. For state of the art automotive chips, the permanent error rate for errors due to aging is <100 FIT. By using active redundancy (TMR or self-checking components), the required error rate for ASIL D (less than 10 FIT) can be achieved in the hardware.

Design errors may be present in the hardware or in the software. The consequences of hardware design errors can be mastered using the active redundancy of diverse hardware.

Measures that result in a reduction in the probability of the presence of an undetected design error in the software are a systematic design process, verification and validation, primarily by comprehensive testing. A significant cause for the occurrence of design errors in the software is the complexity of the software. According to the state of the art, it is possible to so thoroughly validate a complex software system that the required error rate for ASIL B can be achieved, but not that of ASIL D.

BRIEF DESCRIPTION OF THE INVENTION

The present invention discloses a method and a hardware architecture for increasing the reliability of a complex electronics system. By targeted use of hardware and software redundancy, the reliability of the electronic system is significantly increased.

In the field of safety technology in air and space travel, a distinction is made between simple and complex software. If the software that is used is simple and formally verified and/or can be comprehensively tested, it is then assumed that the required error rate for ASIL D can be attained through a careful development process.

If the software that is used is complex, we assume that the probability for the occurrence of design errors corresponds to that of ASIL B. Through software redundancy, meaning the parallel execution of two or more different ASIL B software systems with a subsequent, usage-specific comparison of the results, the reliability of the software can be significantly increased. A method for increasing software reliability by active redundancy (TMR) using diversified software is described in. This method is not applicable, however, if the different software versions do not behave in a replica deterministic manner.

Diversified software is not replica deterministic if there is a non-deterministic design Construct (NDDC) in the software. An NDDC differentiates between two correct but non-compatible scenarios. In general, it cannot be assumed that two different versions of the software having NDDCs will arrive at comparable results.

If, for example, a boulder is lying in the street and a decision must be made whether this boulder should be bypassed on the left or the right, it cannot be generally assumed that two different software versions will arrive at the same result. Although both results are correct, they are not replica deterministic. Error tolerance is thus lost.

The autonomous operation of a motor vehicle requires a software system for image recognition, environmental modeling and trajectory planning. The software for image recognition and environmental modeling is very complex.

According to the invention, it is proposed that at least two different versions of the complex software for image recognition and environmental modeling be implemented and that the results of these versions be consolidated to be able to conduct trajectory planning on the basis of a single, consolidated environmental model.

In the event that trajectory planning can be implemented using simple software, it is proposed that a single software version of the trajectory planning be executed on error-tolerant hardware.

In the event that the software for trajectory planning is not simple, but complex, it is proposed that at least two different versions of the trajectory planning be executed and the results of these multiple trajectory planning be transmitted to a decider for determination of a single, consolidated trajectory.

According to the invention, it is also proposed to identify the NDDCs contained in the entire software system and to remove them from the software system. An NDDC that makes a judgment between proposed alternatives is realized using simple software without software redundancy. The simple software is implemented on error-tolerant hardware in order to mask hardware errors that arise.

The reliability of the complex software without NDDC's is significantly increased by a comparison of results from a plurality of different versions of the complex software. The complex software determines a plurality of alternatives that are passed on to the NDDCs for a decision.

BRIEF DESCRIPTION OF THE DRAWINGS

The present invention is explained using the following drawings.

DETAILED DESCRIPTION OF AN IMPLEMENTATION

Figure 1:
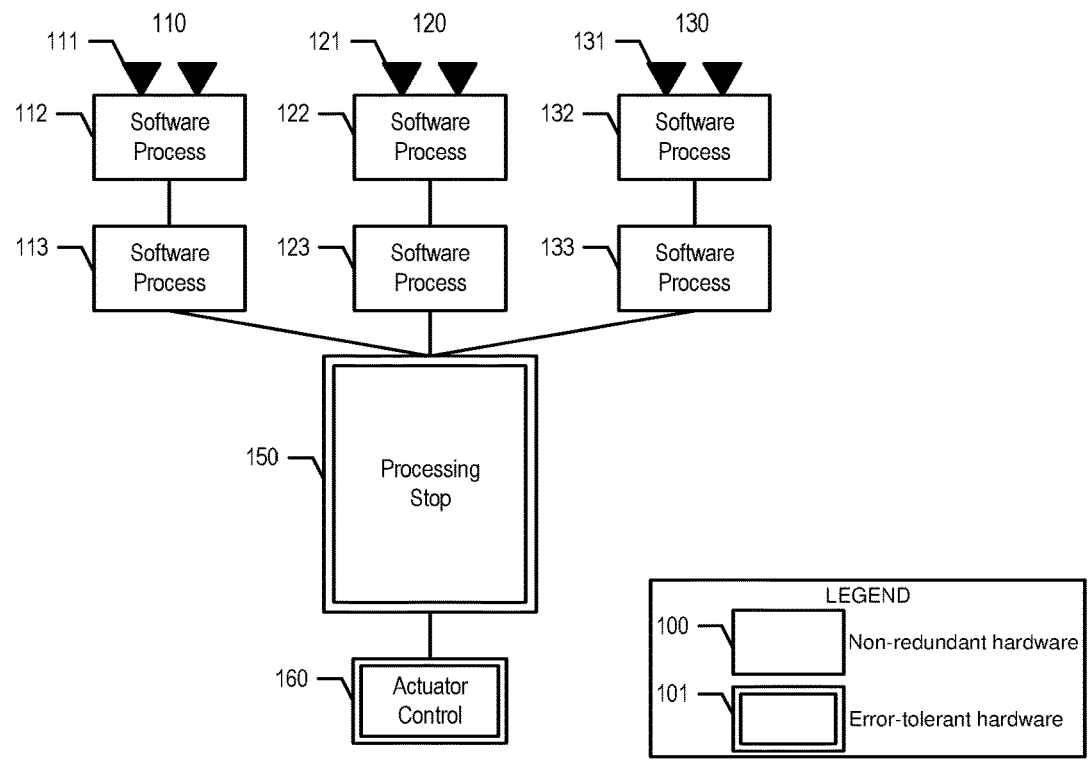
FIG. 1 shows a data flow diagram of a complex electronic system for autonomous control of a vehicle having diverse environmental modeling and non-redundant trajectory planning.

The following concrete description of an implementation addresses one of the many possible executions of the new method using the example of an autonomous vehicle control system. The description uses terms that are described more accurately below.

A controlled object (abbreviated CO) is a technical system that is controlled by a computer system and/or a person and has the goal of performing a predetermined task over a period of time under specific environmental conditions. Examples of COs are: a vehicle, an airplane, an agricultural machine, a robot or a drone.

An environmental model is a digital data structure that at a given instant represents an image of the essential characteristics of the environment in the previous description. An example of an environmental model is the description of a street and the objects found on the street at a given instant.

A trajectory is a path that a CO can follow in the course of time in order to complete the given task. The characteristics of the trajectories of a CO depend upon the design of the CO, the given task and the current environmental conditions. For example, one can refer to a possible path that a vehicle can follow under given environmental conditions in order to reach its destination as a trajectory.

A software process is understood to be the execution of a program system on one or a plurality of computers.

A fault containment unit (FCU) is an assembly that encapsulates the immediate consequences of an error cause.

The term error-tolerant hardware is to be understood as a hardware architecture that masks hardware errors which arise that correspond to the aforementioned error hypothesis. Examples of such hardware architectures are triple modular redundancy (TMR) or the parallel implementation of software on self-checking assemblies. In accordance with the state of the art, the redundant FCUs receive their input data over at least two independent communications channels and transmit their output data over at least two independent communication channels.

A data flow path (DFP) is a sequence of software processes, wherein the first software process reads input data and the output data of a previously stored software process represent the input data for the ensuing software process. The output data of the last software process are the result data of the DFP. In many usage cases of real-time data processing, a DFP is cycled through. Between the cycles of a DFP, the interior condition of a software process can be stored. In many usage cases of real-time data processing, the first software process of a DFP acquires the sensor data and the last software process of a DFP produces the target values for the actuators.

Two DFPs are diverse if they pursue the same destination setting, but the software processes of the DFPs use different algorithms (algorithmic diversity) and/or different input data (data diversity).

Environmental modeling is a software process that creates an environmental model based on the static data of the environment and the dynamic data of the environment collected from different sensors.

A consolidated environmental model is an environmental model that integrates a number of independently created environmental models into a single environmental model.

A trajectory design is a software process that, on the basis of a given model of the environment, determines one or more possible trajectories which solve a predetermined task.

A decider is a software process that receives a number of proposals as input data, analyzes these proposals and has the freedom to arrive at a decision as to which—possibly changed—proposal is selected. In many cases, a decider is an NDDC. For example, a decider receives a number of proposals for possible trajectories of a vehicle as input and decides on one—possibly changed—trajectory that will be implemented.

For example, the term "observed data" could be understood to comprise the data that arise from observation.

FIG. 1 shows a data flow diagram of a complex electronic system for autonomous control of a vehicle. The simply framed boxes 100 show software processes that arrive in non-redundant hardware for execution. The doubly framed boxes 101 show software processes that arrive in error-tolerant hardware for execution, Vertical lines of connection between the boxes in FIG. 1 show the data flow from top to bottom.

In FIG. 1, three different DFPs 110, 120, and 130 are illustrated. Each of the DFPs provides Observation of the environment of the vehicle via its own sensors. The sensors are read cyclically. DFP 110 has sensors 111, DFP 120 has sensors 121 and DFP 130 has sensors 131, Examples of vehicle sensors are cameras, radar sensors, LIDAR sensors and ultrasound sensors. In the first processing step of the DFP, the raw sensor data are read off and pre-processed. This is software process 112 in DFP 110, software process 122 in DFP 120 and software process 132 in DFP 130.

It is advantageous if software processes 112, 122 and 132 use different algorithms (algorithmic diversity) that are supplied with different input data (data diversity).

It is advantageous, if sensors 111, 121 and 131 observe the environment simultaneously. Simultaneous observation can be achieved by a distributed trigger signal derived from an error-tolerant global time.

In the second processing step of the DFP, the environmental modeling is completed on the basis of the received sensor data and information about the static environmental parameters (e.g. from the maps of the navigation system). That is software process 113 in DFP 110, software process 123 in DFP 120 and software process 133 in DFP 130.

It is advantageous if software processes 113, 123 and 133 use different algorithms (algorithm diversity) that are supplied with different input data (data diversity).

In FIG. 1, it is assumed that the software for trajectory planning is simple and can therefore be implemented without software diversity. In third processing step 150 in FIG. 1, a single, consolidated environmental model is created from the diverse, received environmental models that represents the basis for the subsequent non-redundant trajectory planning. The trajectory planning determines the target values for intelligent actuator control 160. The software processes of processing step 150 and actuator control 160 are executed on error-tolerant hardware.

Figure 2:
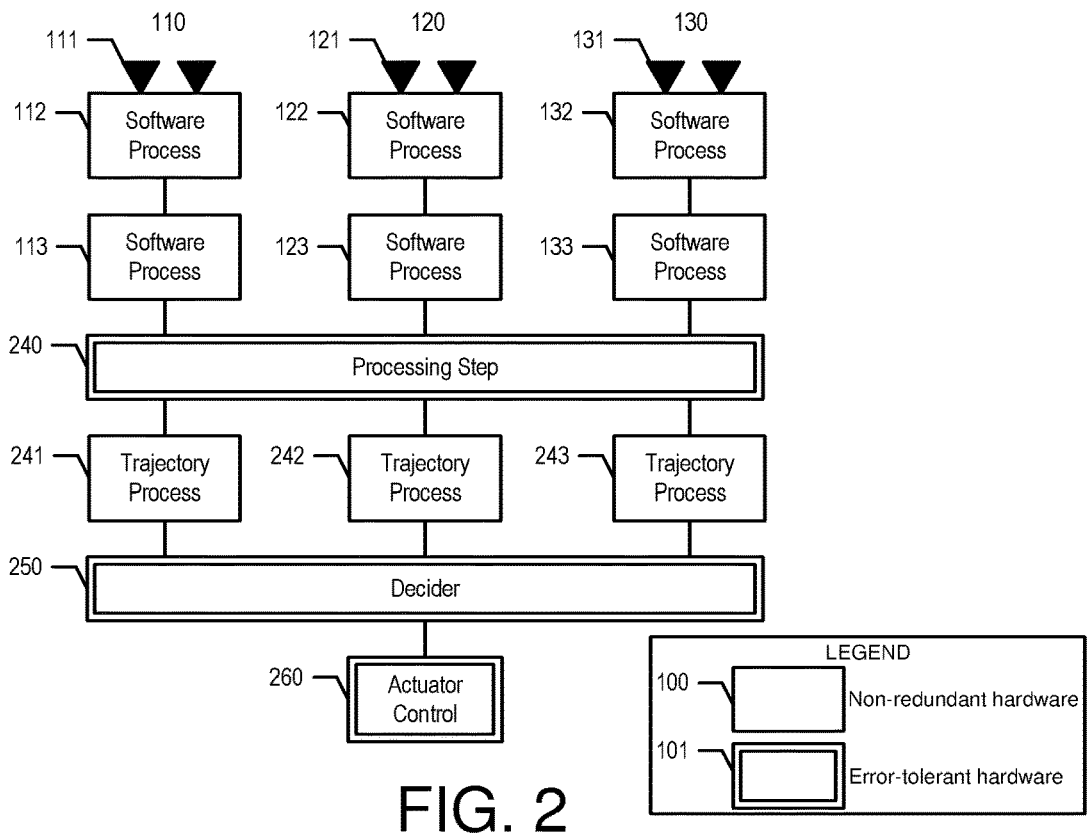
FIG. 2 shows a data flow diagram of a complex electronic system for autonomous control of a vehicle having diverse environmental modeling and having diverse trajectory planning.

In FIG. 2, it is assumed that the software for trajectory planning is complex and therefore cannot be implemented without software diversity. In processing step 240 in FIG. 2, a single, consolidated environmental model is first created from the different received environmental models that represents the basis for the subsequent non-redundant trajectory planning. Processing step 240 is implemented on error-tolerant hardware.

In subsequent parallel processing steps 241, 242 and 243, a plurality of diverse versions of the trajectory planning are implemented. Each version of the trajectory planning determines one or more trajectories and evaluates the determined trajectories with respect to efficiency in achieving the goal and safety.

Decider 250 thus includes a plurality of differently evaluated proposals for trajectories to trajectory plannings 241, 242 and 243 and decides on one trajectory, which is proposed and properly assessed by at least two of the three trajectory planning processes 241, 242 and 243, Finally, the target values for implementing the chosen trajectory are calculated by decider 250 and submitted to intelligent actuators 160, Decider 250 is implemented on error-free hardware.

It is advantageous, if the transmission of the trajectory proposals from software processes 114, 124 and 134 takes place almost simultaneously to decider 250. This can be achieved by deriving the trigger signals for action from the progression of an error-tolerant global time.

In the following section, an example of a different strategy is described. While trajectory planning 241 and trajectory planning 242 follow the same task—driving the vehicle to the planned goal—trajectory planning 243 has the task of guiding the vehicle as quickly as possible into a safe state, e.g. parking on the side of the road. If decider 250 cannot find a trajectory that conforms to the suggested alternatives from 241 and 242, decider 250 then takes the proposal from 243 and gives target values to actuators 260, which guide the vehicle into a safe state (e.g. parking on the side of the road).

The diversity of the complex software can be achieved either through data diversity or through algorithmic diversity or by using both data diversity and algorithmic diversity. It is a large advantage if both data diversity and algorithmic diversity are implemented.

If only one diversity s used for economic reasons, there are some possibilities for cost reduction.

If data diversity is omitted, one sensor can transfer the received data to a plurality of diverse software processes. Data diversity can also be achieved using a transformation of the model representation—for example, the representation of the trajectories in different coordinate systems.

If algorithmic diversity is omitted, all software processes can use the same algorithms.

During ongoing operations, it is very difficult to decide whether a discrepancy in the result of one DFP was caused by the two other DFPs because of an aging error in the hardware or by a software error. At the moment of the occurrence, however, this decision is irrelevant because the proposed architecture masks the two error types.

We claim:

1. A method for controlling a technical process that is embedded in a changing environment, wherein an electronic system of an autonomous vehicle that implements a control system includes a plurality of sensors, actuators, and node computers, wherein the plurality of node computers exchange data in real-time, the method comprising:
differentiating between complex software and simple software, wherein simple software comprises software in which an error rate required for ASIL D is attainable, and wherein complex software comprises software in which a probability for an occurrence of design errors corresponds to ASIL B;
executing the complex software simultaneously on at least two independent data flow paths (DFP) (110, 120), wherein each independent DFP cyclically monitors a technical process and the changing environment using the plurality of sensors and builds a model of the technical process and the changing environment from observed data by algorithms, wherein the observed data are diverse and the algorithms used in each independent DFP are diverse, or the observed data are not diverse and the algorithms used in each independent DFP are diverse, or the observed data are diverse and the algorithms used in each independent DFP are not diverse; and
building, in a subsequent processing step, a single consolidated environmental model for trajectory planning, from a plurality of different environmental models using the simple software, which is executed on error-tolerant hardware.

2. The method according to claim 1, wherein, if software for trajectory planning is simple, then non-redundant trajectory planning defines a trajectory in the single consolidated environmental model and target values corresponding to the trajectory planning are transmitted to an intelligent actuator control.

3. The method according to claim 1, wherein, if software for trajectory planning is complex, then at least two different trajectory plannings (241, 242, 243) in the consolidated environmental model define one or more trajectories for achieving an objective and transmit these trajectories to a simple decider (250) for selection.

4. The method according to claim 3, wherein the at least two trajectory plannings (241, 242, 243) evaluate the trajectories from the standpoint of achieving the objective and safety.

5. The method according to claim 3, wherein the decider (250) selects a trajectory that has been proposed by the at least two trajectory plannings, and the decider (250) evaluates the target values for the actuators and transmits them to an intelligent actuator control (160).

6. The method according to claim 3, wherein the trajectory planning and the decider (250) are executed on error-tolerant hardware.

7. The method according to claim 3, wherein the decider (250) is executed on error-tolerant hardware.

8. The method according to claim 1, wherein data diversity in each of the independent DFPs is eliminated and data received by the sensors is transmitted to a plurality of the at least two independent DFPs.

9. The method according to claim 1, wherein algorithm diversity in the at least two independent DFPs is omitted and the same algorithms are used in all of the at least two independent DFPs.

10. The method according to claim 8, wherein the data diversity is improved by using different coordinate systems to represent the trajectories.

11. The method according to claim 1, wherein the plurality of the sensors, the actuators, and the node computers have access to an error-tolerant global time and control of the data flow between the plurality of node computers is derived from the progression of the global time.

12. An electronic system of an autonomous vehicle for controlling a technical process that is embedded in a changing environment, the electronic system comprising:
a plurality of sensors;
a plurality of actuators; and
a plurality of node computers, which exchange data in real-time,
wherein:
the electronic system is configured to differentiate between complex and simple software, wherein simple software comprises software in which an error rate required for ASIL D is attainable, and wherein complex software comprises software in which a probability for an occurrence of design errors corresponds to ASIL B,
the complex software is configured to be simultaneously executed on at least two independent data flow paths (DFP) (110, 120),
each DFP is configured to cyclically monitor the technical process and the changing environment using the sensors and to build a model of the technical process and the changing environment from observed data by algorithms, wherein the observed data are diverse and the algorithms used in each DFP are diverse, or the observed data are not diverse and the algorithms used in each DFP are diverse, or the observed data are diverse and the algorithms used in each DFP are not diverse, and
the system is configured to build, in a subsequent processing step, a single consolidated environmental model for trajectory planning, from a plurality of different environmental models, using the simple software which is executed on error-tolerant hardware.

13. A method for controlling a trajectory of a controllable autonomous vehicle in a changing environment, the method comprising:
providing an electronic system that implements a control system for controlling the controllable autonomous vehicle, wherein the electronic system includes a plurality of sensors, actuators, and node computers which are configured to exchange data in real-time, and wherein the electronic system includes both complex software and simple software and is configured to differentiate between the complex software and the simple software, wherein simple software comprises software in which an error rate required for ASIL D is attainable, and wherein complex software comprises software in which a probability for an occurrence of design errors corresponds to ASIL B;
executing the complex software simultaneously on at least two independent data flow paths, wherein each independent data flow path (DFP) cyclically monitors a technical process of the control system and the changing environment using the plurality of sensors and builds a model of the technical process and the changing environment from observed data using algorithms, wherein (i) the observed data are diverse and the algorithms used in each independent DFP are diverse, (ii) the observed data are not diverse and the algorithms used in each independent DFP are diverse, or (iii) the observed data are diverse and the algorithms used in each independent DFP are not diverse; and
building a single consolidated environmental model for planning a trajectory of the controllable autonomous vehicle from a plurality of different environmental models using the simple software, which is executed on error-tolerant hardware.

14. The method of claim 13, further comprising implementing a plurality of different versions of trajectory planning to produce two or more proposals for a trajectory for the controllable autonomous vehicle, and then using a decider to select, based on the proposals, a trajectory for the controllable autonomous vehicle.

15. The method of claim 14, further comprising calculating target values for implementing the selected trajectory and submitting the target values to actuators.

\* \* \* \* \*